United States Patent [19]

Allen

[11] 4,366,361

[45] Dec. 28, 1982

[54] METHOD OF PRODUCING AN ELECTRICAL COMPONENT

[75] Inventor: Brian R. Allen, Birmingham, England

[73] Assignee: Lucas Industries Limited, Birmingham, England

[21] Appl. No.: 308,817

[22] Filed: Oct. 5, 1981

Related U.S. Application Data

[63] Continuation of Ser. No. 82,157, Oct. 5, 1979, abandoned, which is a continuation of Ser. No. 20,997, Mar. 16, 1979, abandoned, which is a continuation of Ser. No. 783,010, Mar. 30, 1977, abandoned.

[30] Foreign Application Priority Data

Apr. 9, 1976 [GB] United Kingdom ............... 14473/76

[51] Int. Cl.$^3$ ............................................. B23K 11/18
[52] U.S. Cl. ................... 219/78.01; 219/107; 219/118; 219/149
[58] Field of Search ............. 219/107, 118, 149, 78.01

[56] References Cited

U.S. PATENT DOCUMENTS

| | | | |
|---|---|---|---|
| 2,454,579 | 11/1948 | Stauffer | 29/630 E |
| 2,509,021 | 5/1950 | Settle | 29/630 E |
| 3,067,319 | 12/1962 | Zamboldi | 219/118 |
| 3,069,261 | 12/1962 | Kilby | 219/149 UX |
| 3,601,645 | 8/1971 | Whiteheart | 29/630 E |
| 3,946,192 | 3/1976 | Allen | 219/149 |

FOREIGN PATENT DOCUMENTS 985597  3/1965  United Kingdom .

OTHER PUBLICATIONS

Shaw, J. M., Resistance Sintering of Iron and Steel Powders, Welding and Metal Fabrication, Dec. 1963, pp. 505 to 508.

Goetzel et al., Electrically Activated Pressure-Sintering (Spark Sintering) of Titanium Aluminum Vandium Alloy Powders, Modern Devs. of Powder Metallurgy, V. #4, Hauser ed., Plenum Press, 1971.

Primary Examiner—R. R. Kucia
Attorney, Agent, or Firm—Trexler, Bushnell & Wolters, Ltd.

[57] ABSTRACT

A method of producing a brush for a dynamo electric machine comprises the step of passing a heating current through a powder compact of the brush material and a conductive member in electrical contact with said powder compact so as to sinter the compact and connect the conductive member to the compact.

13 Claims, 4 Drawing Figures

METHOD OF PRODUCING AN ELECTRICAL COMPONENT

This application is a continuation of application Ser. No. 82,157, filed Oct. 5, 1979, which was a continuation of application Ser. No. 20,997, filed Mar. 16, 1979, which was a continuation of application Ser. No. 783,010, filed Mar. 30, 1977, all now abandoned.

This invention relates to a method of producing an electrical component and in particular, a brush for a dynamo electric machine.

Brushes for dynamo electric machines are well known in the prior art. Such brushes customarily include a conductive brush body, a conductive support structure carried by the brush body, and a conductive lead connected to the brush body or support structure. The brush bodies of the prior art have been customarily formed from a compacted powder mixture.

The invention resides in a method of producing a brush for a dynamo electric machine, comprising the step of passing a heating current through a powder compact of the brush material and a conductive member in electrical contact with said powder compact so as to sinter the compact and connect the conductive member to the compact.

Preferably, the passage of current is performed in two stages, the current passed during the first stage being less than that during the second stage.

Preferably, the current passed during the first stage is between 1500 amperes and 1800 amperes and is between 2200 amperes and 2400 amperes during the second stage.

Preferably, the powder compact includes copper, lead, carbon and a hard phase.

Preferably, the hard phase is silicon carbide or ferromanganese.

Preferably, the powder compact also contains tin.

Preferably, the heating current is passed between a pair of electrodes which urge the conductive member and the powder compact into engagement with each other.

Preferably, the brush material powder is compacted prior to its introduction between the electrodes.

Alternatively, compaction of the brush material powder is effected by using the electrodes to compress the powder.

In one preferred embodiment, the conductive member is in the form of a support member for the brush and conveniently is formed of steel, aluminium, brass, phosphor bronze or copper.

Preferably, the support member is coated with a bonding material different from the support member material and in the form of copper, nickel or bronze.

Preferably, said support member is adapted to have an electrical lead connected thereto and the method includes the further step of connecting the lead to the support member.

Preferably, the connecting step is effected by resistance welding.

Alternatively, the step of passing the heating current through the powder compact and the conductive support member also serves to physically and electrically connect a conductive lead to the support member and the compact.

Preferably, the compact and/or support member is shaped to define an opening in which the lead is received.

Preferably, a heat sink is mounted in thermal connection with the conductive lead during passage of the heating current.

In an alternative embodiment, the conductive member is defined by an electrical lead.

In the accompanying drawings.

Figure 1:
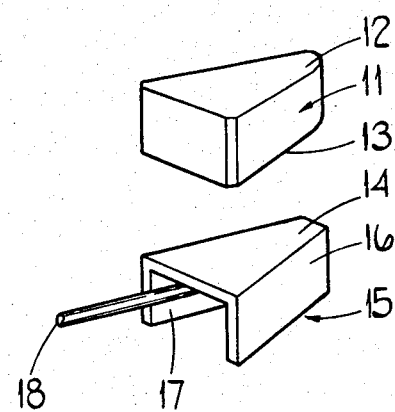
FIG. 1 is an exploded, perspective view of a brush produced by a method according to a first example of the invention.

Referring to FIG. 1, the brush shown is intended for use in a dynamo electric machine having a face-type commutator and includes a generally wedge-shaped body 11 which, in use, engages the commutator at one end surface 12 of the body. Secured to the opposite end surface 13 of the body 11 is a substantially U-shaped, conductive support member 15 which in use serves to support the brush in the brush holder of the dynamo electric machine. The surface 13 is secured to the base 14 of the member 15 so that the limbs 16,17 of the member project away from the body. Moreover, the base 14 is tapered so as to be substantially complementary with the end surface 13, and is joined to the limbs 16,17 at its mutually inclined opposite sides respectively.

The support member 15 is formed from 0.03 inch thick mild steel sheet which is bent to the required shape and plated with nickel to a thickness of 0.001 inch. The nickel coating assists in bonding the brush body 11 to the backing member 15 although, as an alternative to nickel, other bonding materials such as copper and bronze can be used. Nickel is, however, preferred. Similarly, the support member can be formed of aluminium brass, phosphor bronze or copper, instead of mild steel.

In addition, the brush includes a flexible, conductive lead 18 which is secured to the limb 17 of the support member 15 and which is preferably formed of tough pitch, high conductivity copper.

The body 11 is formed by sintering a compacted powder mixture having the following composition by weight:
Copper—79%
Lead—12.75%
Tin—2.55%
Graphite—4.00% and,
Silicon carbide—1.7% (less than 25 micron average particle size).

The mixture also contains 0.1 parts by weight of a zinc stearate lubricant for every 100 parts by weight of the composition defined above. The lubricant is present to assist compaction of the powder and reduce wear of the dies used to effect compaction, but the amount of lubricant is reduced to a minimum so as to avoid defects in the product as a result of excess volatilisation during sintering.

In one practical embodiment, the copper powder employed in the above mixture had a purity of at least 99%, the major impurities being lead (maximum of 0.2% by weight) and oxygen (maximum 0.2% by weight). Moreover, a particle size analysis of the copper powder showed that not more than 0.2% by weight had a size in excess of 53 microns. The lead powder employed in the mixture had a purity of at least 99.95% so that the effect of any impurities was negligible, and a particle size analysis showed that 1% by weight of the lead powder had a particle size in excess of 150 microns, 10% by weight had a particle size between 75 and 150 microns and 15% by weight had a particle size between 45 and 75 microns, the particle size of the remainder being 45 microns or below. The tin powder had a purity of at least 99% again making the effect of impurities negligible and particle size analysis showed that about 97.5% by weight of the tin powder had a particle size below 53 microns. With regard to the graphite powder 99.5% by weight had a particle size below 45 microns and the purity of the powder was between 96 and 97%, the major impurities after ashing being 1.4% silica, 0.93% by weight alumina, 0.2% by weight calcia, 0.07% by weight each of sulphur and magnesia, 0.68% by weight iron and not more than 0.2% by weight moisture. The silicon carbide powder had a mean particle size of 13 microns and was 98.7% pure, the impurities present being 0.48% by weight silica, 0.3% by weight silicon, 0.9% by weight iron, 0.1% by weight aluminium and 0.3% by weight carbon.

To produce the body 11, the powder mixture described above is initially introduced into a die cavity of the shape of the required body 11, whereafter the mixture is compressed at an applied load of between 10 and 35 tons per square inch (hereinafter T/in$^2$), preferably 30 T/in$^2$, to a thickness between the surfaces 12, 13 of 0.30 to 0.32 inch. The compressed mixture is then located on the support member 15, which at this stage is preferably in the form of a planar sheet of the backing material, the sheet being bent to the required shape after the subsequent resistance sintering operation. The resultant assembly is then inserted between the tips of a pair of sintering electrodes, the tips conveniently being formed of steel, molybdenum, tungsten, elkonite or carbon. The electrodes are then urged against the support member 15 and the powder compact with an applied load of 20 pounds force (hereinafter lb. F) and simultaneously a current of between 1500 amperes and 1800 amperes, preferably 1650 amperes, is passed between the electrodes. The current is maintained at this value for 1.5 to 2 seconds to precondition the powder mixture which is found to improve the consistency of the properties of the final brush. The current is then increased to between 2200 amperes and 2400 amperes, preferably 2300 amperes, for a further 5–6 seconds, during which time the powder mixture is resistance sintered to produce the body 11 and the support member 15 is resistance brazed to the body 11. The entire resistance heating operation is performed in ambient atmosphere.

In the resultant product the sintered body 11 is found to be strongly bonded to the member 15, and to have the required physical and electrical properties for an electrical brush despite the varying particle sizes in the powder mixture and the temperature gradients which necessarily build up between the member 15 and the surface 12 during sintering. In fact, the relatively high thermal conductivity of the electrode tip in contact with the member 15 causes it to act as a heat sink so that the temperature gradients generated can be as high as 250° C. However, using the parameters referred to above it is found to be possible to maintain the surface 12 at between 600°–700° C., which is sufficient to sinter the powder mixture, while at the same time preventing the temperature at the support member rising above 800°–840° C., which is a satisfactory operating temperature for the bonding materials described without being excessive for sintering of the powder mixture. The temperature gradient does, however, result in a gradual variation in the microstructure of the sintered body 11 between the surfaces 12, 13. Thus adjacent the surface 13 the microstructure is found to consist of copper/tin grains surrounded by a grain boundary layer of lead, where the lead has melted and flowed at the high temperatures produced in this region, while adjacent the surface 12 heterogeneous lead-rich areas are present in the microstructure.

After the sintering operation, the member 15 is, if necessary, bent to the required shape by passing the assembly through a sizing die which also ensures that the body 11 is of the required dimensions. The brush is then completed by resistance welding the lead 18 to the base 14 of the support member. This process is effected by passing a welding current between a tungsten electrode engaging the lead 18 and a copper electrode formed with a recess which is complementary with the body 11 and in which the body is engaged. Typically, the welding parameters employed are an alternating current of 1800 amperes passed for 4 cycles of a 50 cycle supply and a force of 75 lb.f applied to the electrodes to urge the lead 18 and limb 17 into interengagement.

The brush according to the above example is intended for use with a face-type commutator of the kind in which the insulating material between adjacent conductive segments extends flush with the brush engaging surfaces of the segments. It is therefore necessary that the brush is able to cope with the variation in material at the brush engaging surface of the commutator while at the same time exhibiting a low wear rate of the brush together with a low rate of commutator wear. When the brush of the above example is tested with such a commutator, it is found that the brush operates satisfactorily and both the commutator and the brush exhibit a low rate of wear. Thus in said one practical embodiment when sets of brush samples were tested in road vehicle starter motors each employing a commutator of the kind specified the maximum brush wear rate averaged out at $4.5 \times 10^{-3}$ inch/1000 operations while the commutator wear exhibited an average value of $4.2 \times 10^{-4}$ inch/1000 operations. This represents a commercially attractive brush. Satisfactory results were also obtained when the above example was repeated without tin in the starting mixture.

In a modification of the above example, the step of separately compacting the powder mixture for the body 11 is omitted. Instead, the uncompacted powder mixture is poured on top of the support member with the latter being received in a die cavity defined in a die formed of carbon or a ceramic material such as silicon nitride or alumina. The powder mixture is then compacted between the pair of sintering electrodes employed in the previous example, while at the same time a heating current is passed in two stages between the electrodes to sinter the powder mixture into the body 11 and braze the support member 15 to the body 11. Completion of the brush then proceeds in the manner described above. In this modification, the support member is conveniently formed of aluminium or copper without the provision of a coating of a bonding material.

Figure 2:
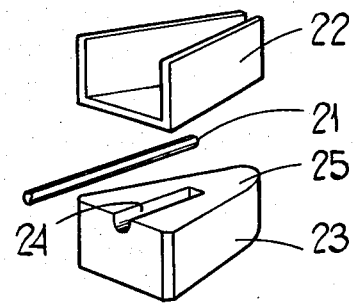
FIG. 2 is a perspective view showing one stage during a method according to a second example of the present invention.

Referring to FIG. 2, in the second example it is required to produce a brush for use with a face-type commutator, the brush including a generally wedge-shaped body having a conductive lead 21 and a substantially U-shaped, conductive support member 22 secured to one end surface of the body. The body is formed from the powder mixture employed in the previous example and to produce the body, the required amounts of the constituents of the mixture are initially introduced into a Turbula mixer and mixed for 80 minutes. The resultant powder is then poured into the die cavity defined within a press, whereafter the mixture is compressed at an applied load of between 10 and 35 T/in$^2$ preferably 30 T/in$^2$, into a compact 23 of the required shape for the brush body.

As shown in FIG. 2, the compact 23 is formed with a semi-cylindrical recess 24 in the end surface 25 of the compact to which the lead 21 and support member 22 are to be secured. In one practical embodiment, the recess 24 was 0.312 inch long and the cylinder defined in part of the recess was circular and had a diameter of 0.105 inch. The recess 24 is conveniently formed by a drilling operation, or more preferably by suitable shaping of the punches used to produce the compact 23.

The conductive lead 21 is defined by a length of copper braid, which in said one practical embodiment had seven entwined strands, each of which consisted of 36 copper wires 0.0048 inch in diameter. The braid is cut to length electrically so as to bond the cut ends of the wires in the braid, whereafter the cut end of the braid is inserted in the recess 24. The support member 22, which in said one practical embodiment was formed from 0.03 inch thick steel sheet plated to a depth of 0.0005 inch with copper, is then positioned on top of the lead 21, whereafter the entire assembly is inserted between the tips of a pair of sintering electrodes (not shown). The electrodes are conveniently formed of steel, molybdenum, tungsten, elkonite or carbon and preferably a water-cooled copper heat sink is mounted in thermal connection with the lead 21 over a short length of the lead, conveniently 0.5 inch, positioned as close as possible to the compact 23 and support member 22. The sintering electrodes are then urged against the support member 22 and the compact 21 with an applied load of 20 lb.f and a two-stage electrical heating process is performed on the assembly in the manner described in the previous example. In this way the powder compact is resistance sintered to produce the brush body and the lead 21 is resistance brazed to the body and the support member 22. Preferably, the arrangement is such that the sintering electrodes urge the support member into physical contact with the surface 25 of the compact 23, whereby the passage of current also serves to resistance braze the support member to the brush body.

Figure 3:
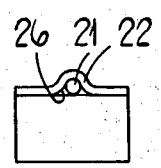
FIG. 3 is a perspective view of a brush produced by a method according to a modification of the second example.

Referring to FIG. 3, the brush of this modification is produced by the technique of the second example, but the support member 22 is now in the form of a planar sheet of copper plated steel which has been stamped to define a recess 26 in the surface of the sheet to be presented to the commutator body. The electrical lead 21 of the brush is therefore received in the recess 26 so as to be trapped between the support member 22 and the brush body.

Figure 4:
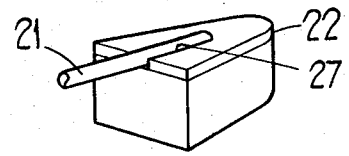
FIG. 4 is a sectional view of a brush produced by a method according to a further modification of the second example.

Referring to FIG. 4, the technique of the second example is also employed in this further modification, but now the conductive lead 21 is located in an elongated slot 27 formed in a generally planar support member 22.

In a further modification (not shown) of the second example, the support member is omitted and the resistance heating operation serves merely to sinter the powder compact 23 and resistance braze the lead 21 to the sintered compact.

In the above examples, the body 11 of the brush has been composed of a sintered mixture of copper, lead, tin, carbon and silicon carbide as an electrically conductive ceramic hard phase. In this respect, it is to be appreciated that the indentation hardness (VPN) value of silicon carbide powder is between 1890 and 3430 (mean 2876) using a 200 g load which would normally be considered as more suitable for cutting tools and abrasives. The method described above can, however, also be employed with brush compositions using a metallic hard phase, especially ferromanganese which has a VPN value of only between 782 and 1033 using a 100 g load.

Thus in a third example, the brush shown in FIG. 1 is produced from a starting mixture having the following composition by weight:
Copper—78.4%
Lead—11.49%
Tin—0.05%
Graphite—5.03%, and
Ferromanganese—5.03%

The mixture also contains 0.1 parts by weight of a zinc stearate lubricant for every 100 parts by weight of the composition defined above. In one practical embodiment copper, lead, tin and graphite powders in mixture were the same as those employed in the previous example whereas the ferromanganese had a particle size of less than 75 microns.

The mixture is compacted as described above to a density of 6.87 g/cc and is then resistance sintered and brazed to a backing member using the same parameters as in the first example. During resistance sintering it is found that there is little tendency for the ferromanganese to lose its hardness as a result of the manganese diffusing away from the ferromanganese particles, whereas this is found to be a problem if conventional furnace sintering is employed. After resistance welding of the necessary electrical lead to the backing member, it is found that the resultant brush performs satisfactorily when employed in a road vehicle starter motor employing a face-type commutator of the kind referred to above. Thus in the one practical embodiment, the brush was found to exhibit a maximum wear rate of about $6.4 \times 10^{-3}$ inch/1000 operations, while the commutator wear was about $4 \times 10^{-3}$ inch after 30000 operations. The method of the third example was also repeated with ferromanganese powder having a maximum particle size of 390 microns and in this case the resultant brush had a maximum wear rate of $6.2 \times 10^{-3}$ inch/1000 operations, whereas the commutator wear after 34,447 operations was $8 \times 10^{-3}$ inch.

I claim:
1. A method of producing a brush for a dynamo electric machine comprising the steps of: providing a powder mixture consisting essentially of copper, tin, lead, carbon and a hard phase, compacting said powder mixture under a predetermined applied load to form a powder compact defining a brush body of predetermined thickness between a mounting surface and an opposite commutator engaging surface, providing a conductive support member, positioning said conductive support member in electrical contact with said mounting surface of said powder compact, urging a pair of electrodes against said support member and said powder compact, and passing an electrical current through said elec- trodes and hence through said support member and said powder compact for sintering sad compact and for electrically connecting said conductive member to said compact, the magnitude and time duration of said electrical current being controlled such that the temperatures of said commutator engaging surface and of said support member are maintained within predetermined temperature ranges, so as to result in a gradual variation in the microstructure of the brush body between the two surfaces thereof, whereby adjacent the support surface, the microstructure consists essentially of copper/tin grains surrounded by a grain boundary layer of lead and adjacent the commutator engaging surface, heterogeneous lead-rich areas are present in the microstructure.

2. A method as defined in claim 1 wherein the step of passing an electrical current comprises the steps of first passing an electrical current of a first predetermined magnitude for a first predetermined time for preconditioning said powder compact and thereafter passing an electrical current of a second, greater predetermined magnitude for a second predetermined time for sintering said powder compact and for electrically connecting said conductive support member to said compact.

3. A method as defined in claim 2 wherein said first current magnitude is between substantially 1500 amperes and substantially 1800 amperes and wherein said second current magnitude is between substantially 2200 amperes and substantially 2400 amperes.

4. A method as defined in claim 2 or claim 3 wherein said first predetermined time is between substantially 1.5 seconds and substantially 2 seconds and wherein second predetermined time is between substantially 5 seconds and substantially 6 seconds.

5. A method as defined in claim 1 wherein said hard phase is silicon carbide.

6. A method as defined in claim 1 wherein said hard phase is ferromanganese.

7. A method as defined in claim 1 wherein said step of urging said pair of electrodes further includes urging said electrodes with an applied load of on the order of substantially 20 lbs. force.

8. A method as defined in claim 1 wherein the step of compacting said powder mixture includes compacting said powder mixture at an applied load of between substantially 10 tons per square inch and substantially 35 tons per square inch.

9. A method as defined in claim 1 wherein the step of compacting said powder mixture is performed simultaneously with the step of passing said electrical current, said predetermined applied load being applied to said electrodes.

10. A method as defined in claim 1 wherein said conductive member is formed from one of the group of materials consisting of steel, aluminum, brass, phosphor, bronze and copper.

11. A method for producing a brush for a dynamo electric machine comprising the steps of: providing a powder mixture consisting essentially of copper, lead, carbon and a hard phase, compacting said powder mixture under an applied load of between substantially 10 tons per square inch and substantially 35 tons per square inch to form a powder compact defining a brush body having a thickness of between substantially 0.30 inches and substantially 0.32 inches and having a mounting surface and an opposite commutator engaging surface, providing a conductive support member, positioning said conductive support member in electrical contact with said mounting surface, urging a pair of electrodes against said support member and said powder compact at an applied load of substantially on the order of 20 lbs. force, and simultaneously with said urging, passing an electrical current of between substantially 1500 amperes and substantially 1800 amperes through said conductive support member and said powder compact for between substantially 1.5 seconds and substantially 2 seconds to precondition said powder compact and thereafter passing an electrical current, while maintaining said urging, of between substantially 2200 amperes and substantially 2400 amperes for between substantially 5 seconds and substantially 6 seconds for sintering said powder compact and electrically connecting said conductive member to said powder compact.

12. A method of producing a brush for a dynamo electric machine comprising the steps of: providing a powder mixture consisting essentially of copper, tin, lead, carbon and a hard phase; compacting said powder mixture to form a powder compact; providing a conductive member; positioning said conductive member in electrical contact with said powder compact; said conductive member being of larger area than the contacting area of the powder compact in contact therewith; and thereafter, passing an electrical current of predetermined magnitude through said conductive member and said compact to heat said compact and said member for sintering said compact and electrically connecting said conductive member to said compact; the step of passing an electrical current of predetermined magnitude through said conductive member and said compact comprising the steps of first passing an electrical current of a first predetermined magnitude through said member and said compact for preconditioning said powder compact and thereafter passing an electrical current of a second predetermined magnitude through said member and said compact for sintering said compact and connecting said conductive member to said compact, and wherein said first predetermined magnitude is less than said second predetermined magnitude.

13. A method as defined in claim 12 wherein said first current magnitude is between 1500 and 1800 amperes and wherein said second current magnitude is between 2200 and 2400 amperes.

* * * * *